US009125200B2

(12) United States Patent
Choi et al.

(10) Patent No.: US 9,125,200 B2
(45) Date of Patent: Sep. 1, 2015

(54) CARRIER AGGREGATION SCHEDULING BASED ON TRAFFIC CHARACTERISTICS AND CELL CHARACTERISTICS

(71) Applicant: MARVELL WORLD TRADE LTD., St. Michael (BB)

(72) Inventors: Jihwan P. Choi, Daegu (KR); Hui-Ling Lou, Sunnyvale, CA (US); Leilei Song, Sunnyvale, CA (US); Ying Cai, Campbell, CA (US)

(73) Assignee: Marvell World Trade Ltd., St. Michael (BB)

(*) Notice: Subject to any disclaimer, the term of this patent is extended or adjusted under 35 U.S.C. 154(b) by 170 days.

(21) Appl. No.: 13/786,972

(22) Filed: Mar. 6, 2013

(65) Prior Publication Data

US 2013/0242777 A1  Sep. 19, 2013

Related U.S. Application Data

(60) Provisional application No. 61/610,829, filed on Mar. 14, 2012.

(51) Int. Cl.
*H04W 72/04* (2009.01)
*H04W 72/06* (2009.01)
*H04W 72/08* (2009.01)

(52) U.S. Cl.
CPC ...... *H04W 72/0446* (2013.01); *H04W 72/0453* (2013.01); *H04W 72/0486* (2013.01); *H04W 72/06* (2013.01); *H04W 72/08* (2013.01)

(58) Field of Classification Search
USPC ........................ 370/252, 332; 455/517, 436
See application file for complete search history.

(56) References Cited

U.S. PATENT DOCUMENTS

| 7,643,830 | B2 * | 1/2010 | Catovic et al. ............. 455/436 |
| 2005/0207367 | A1 | 9/2005 | Onggosanusi et al. |
| 2007/0133401 | A1 * | 6/2007 | Choi et al. ............. 370/229 |
| 2008/0125122 | A1 * | 5/2008 | Zhou et al. ............. 455/436 |
| 2008/0287068 | A1 | 11/2008 | Etemad |
| 2008/0299985 | A1 | 12/2008 | Yang et al. |

(Continued)

FOREIGN PATENT DOCUMENTS

| EP | 1 796 415 | 6/2007 |
| WO | WO-2010-053334 A2 | 5/2010 |

(Continued)

OTHER PUBLICATIONS

International Search Report and Written Opinion in PCT/US2013/029299 dated May 29, 2013.

(Continued)

*Primary Examiner* — Albert T Chou (57) ABSTRACT

A method, implemented by one or more processors, for scheduling traffic streams in a communication network includes determining, via a processor, a plurality of sets of one or more cell characteristics. Each set of cell characteristics in the plurality of sets of cell characteristics corresponds to a different cell in a plurality of cells. The method also includes determining, via a processor, a first set of one or more traffic characteristics corresponding to a first traffic stream, selecting, via a processor, a first cell from the plurality of cells based on (i) the plurality of sets of cell characteristics and (ii) the first set of traffic characteristics, and assigning, via a processor, the first traffic stream to the first cell for an entire duration of the first traffic stream.

21 Claims, 6 Drawing Sheets

(56) References Cited

U.S. PATENT DOCUMENTS

| | | | |
|---|---|---|---|
| 2011/0053596 A1 | 3/2011 | Wohlert et al. | |
| 2011/0142008 A1* | 6/2011 | Choi | 370/332 |
| 2012/0220324 A1* | 8/2012 | Sambhwani et al. | 455/501 |
| 2013/0040683 A1* | 2/2013 | Siomina et al. | 455/517 |
| 2013/0088961 A1* | 4/2013 | Ramachandran et al. | 370/235 |

FOREIGN PATENT DOCUMENTS

| | | |
|---|---|---|
| WO | WO-2011-098593 A1 | 8/2011 |
| WO | WO-2011/150747 A1 | 12/2011 |

OTHER PUBLICATIONS

3GPP TSG RAN WG2 #67bis, "Mapping of Logical Channels to Component Carriers", Miyazaki, Japan, Oct. 12-16, 2009, pp. 1-9.

Pedersen et al., "Carrier Aggregation for LTE-Advanced: Functionality and Performance Aspects," IEEE Communications Magazine, vol. 49, No. 6, pp. 89-95, Jun. 1, 2011.

3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", Dec. 2011, 296 pages.

3GPP TS 23.203 V10.6.0, "3rd Generation Partnership Project; Technical Specification Group Services and System Aspects; Policy and Charging Control Architecture (Release 10)", Mar. 2012, 131 pages.

International Search Report and Written Opinion in PCT/US2013/049257 dated Dec. 20, 2013.

3GPP TSG RAN WG2 #69bis, "Optimization of System Information Handling in Carrier Aggregation", Sony Corporation, Beijing, China, Apr. 12-16, 2010, 3 pages.

3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012, 194 pages.

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", Dec. 2011, 101 pages.

International Preliminary Report on Patentability in corresponding PCT Application No. PCT/2013/029299 dated Sep. 16, 2014 (10 pages).

* cited by examiner

CARRIER AGGREGATION SCHEDULING BASED ON TRAFFIC CHARACTERISTICS AND CELL CHARACTERISTICS

CROSS-REFERENCE TO RELATED APPLICATION

This claims the benefit of U.S. Provisional Patent Application No. 61/610,829, filed on Mar. 14, 2012, the disclosure of which is hereby incorporated by reference herein.

FIELD OF TECHNOLOGY

The present disclosure relates generally to wireless networks and, more particularly, to methods and systems for carrier aggregation scheduling in wireless networks.

BACKGROUND

As data throughput requirements increase, and the amount of available spectrum decreases, carrier aggregation has emerged as an attractive option for wireless service providers. With carrier aggregation, a wider bandwidth may be achieved by utilizing multiple (typically two) component carriers, where the frequency bands centered at the component carriers need not be contiguous. For example, carrier aggregation may be employed in order to utilize both an 800 MHz carrier and an 1800 MHz carrier for transmitting data streams to a single user terminal. Because each component carrier corresponds to a different cell, and the various cells may have different coverage areas, use of carrier aggregation may increase overall coverage area, in addition to increasing throughput.

Current 3rd Generation Partnership Project Long Term Evolution (3GPP LTE) standards do not specify particular carrier aggregation scheduling schemes, but rather provide a large degree of scheduling flexibility. Scheduling schemes that take advantage of this flexibility, however, may increase the complexity of both network scheduling and user terminal receiver design.

SUMMARY

In an embodiment, a method, implemented by one or more processors, for scheduling traffic streams in a communication network includes determining, via a processor, a plurality of sets of one or more cell characteristics. Each set of cell characteristics in the plurality of sets of cell characteristics corresponds to a different cell in a plurality of cells. The method also includes determining, via a processor, a first set of one or more traffic characteristics corresponding to a first traffic stream, selecting, via a processor, a first cell from the plurality of cells based on (i) the plurality of sets of cell characteristics and (ii) the first set of traffic characteristics, and assigning, via a processor, the first traffic stream to the first cell for an entire duration of the first traffic stream.

The above embodiment, and other embodiments described below, may provide certain advantages. In some embodiments, for example, a system operating according to these embodiments may obtain the usual advantages of carrier aggregation (e.g., higher throughput) without requiring that user devices employ highly complex receiver designs. For example, user devices may employ a separate radio for each carrier being aggregated without requiring that higher layers be shared between radios, and/or without requiring that storage buffers be shared between radios.

DETAILED DESCRIPTION

In embodiments described below, carrier aggregation scheduling techniques assign a traffic stream to a single cell for the entire duration of the traffic stream (e.g., for all data packets of the traffic stream). As the term is used herein, a "cell" corresponds to the coverage area of a particular component carrier that is to be aggregated. For example, a first cell may correspond to an 800 MHz carrier, and a second, smaller cell may correspond to an 1800 MHz carrier. In various embodiments, each cell corresponds to a different base station, or to a different radio within a single base station. Typically, the carrier aggregation scheduling techniques described below are used where the different cells being aggregated have overlapping coverage areas, and a user terminal may therefore (in at least some locations and scenarios) be serviced by any one of the two or more cells.

To determine which cell a particular traffic stream is to be assigned to, characteristics of both the aggregated cells and the traffic stream are utilized. In one embodiment, for example, a threshold is calculated based on certain characteristics of the various cells (such as channel bandwidth, coverage distance, and/or interference level, for example), a "score" is calculated for the traffic stream based on characteristics of the stream (such as maximum packet error rate and/or maximum delay, for example), and the traffic stream is assigned to a cell based on a comparison between the score and the threshold. In another example embodiment, a rank is calculated for each of the various cells based on the respective cell characteristics, another rank is calculated for each of one or more traffic streams based on the respective traffic stream characteristics, and the traffic streams are assigned to particular cells based on the respective ranks (e.g., highest-ranked traffic stream to highest-ranked cell, etc.). By using scheduling techniques of this sort, traffic streams may be assigned to cells that are more likely to provide a communication channel suited to the needs of the traffic stream. For example, a video stream with stringent packet error rate requirements may be assigned to a cell able to support a low packet error rate, a voice stream with stringent delay requirements may be assigned to a cell able to provide shorter delays, etc. Moreover, by assigning each traffic stream to a single cell for the entire duration of the stream, scheduling complexity and user terminal receiver design may be simplified.

Figure 1:
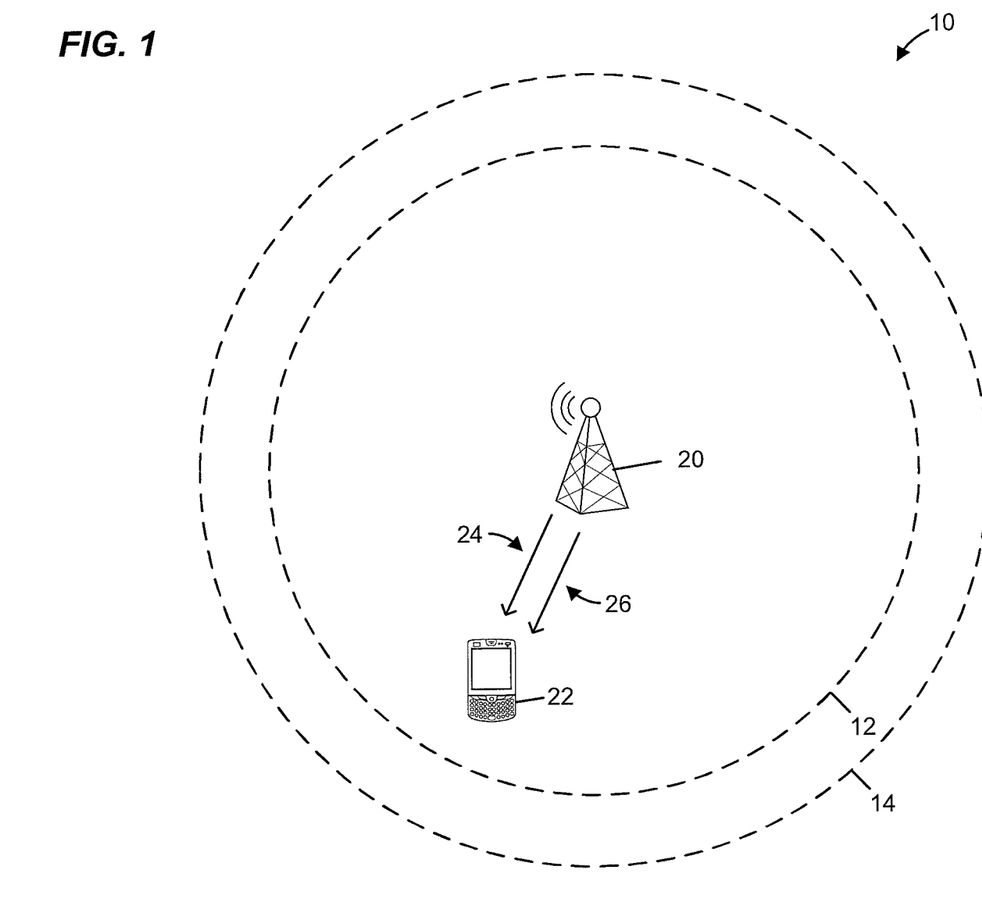
FIG. 1 is a diagram of an example cellular network in which carrier aggregation scheduling techniques are implemented, according to an embodiment.

FIG. 1 is a diagram of an example cellular network 10 in which carrier aggregation scheduling techniques are implemented, according to an embodiment. The cellular network 10 includes a first cell 12 corresponding to a first component carrier and a second cell 14 corresponding to a second component carrier. In one embodiment, for example, cell 12 corresponds to an 1800 MHz carrier and cell 14 corresponds to an 800 MHz carrier. In the example embodiment of FIG. 1, both cell 12 and cell 14 are supported by a single base station 20. In one example embodiment, the cellular network 10 is a 3GPP LTE system and the base station 20 is an "eNodeB." In another example embodiment, the cellular network 10 is a 3GPP wideband code division multiple access (WCDMA) system and the base station 20 is a "NodeB." In yet another example embodiment, the cellular network 10 is a WiMAX system. The base station 20 includes a separate radio (e.g., transceiver(s), antenna(s), etc.) for each component carrier to be aggregated, in an embodiment. Alternatively, in an embodiment, the cell 12 corresponds to a first base station and the cell 14 corresponds to a different, second base station. In some embodiments where cells 12 and 14 correspond to different base stations, cells 12 and 14 are not centered at the same geographic location. Moreover, in some embodiments, the cellular network 10 includes one or more additional cells, not seen in FIG. 1, that each correspond to an additional component carrier, and overlap with cell 12 and/or cell 14.

The cellular network 10 also includes a user terminal 22. In one embodiment where the cellular network 10 is a 3GPP LTE system, for example, the user terminal 22 is a "user equipment," or "UE." The user terminal 22 includes a separate radio (e.g., transceiver(s), antenna(s), etc.) for each component carrier to be aggregated, in an embodiment. In an embodiment, the user terminal 22 is configured to receive some physical layer (PHY) packets from base station 20 via a downlink 24 corresponding to the component carrier of the first cell 12, and other PHY packets from base station 20 via a downlink 26 corresponding to the component carrier of the second cell 14. Moreover, in an embodiment, user terminal 22 is configured to transmit some PHY packets to base station 20 via an uplink (not seen in FIG. 1) corresponding to the component carrier of the first cell 12 and other PHY packets to base station 20 via an uplink (also not seen in FIG. 1) corresponding to the component carrier of the second cell 14.

A carrier aggregation scheduler (not shown in FIG. 1) determines whether the packets of a particular traffic stream are to be transmitted to user terminal 22 via downlink 24 or via downlink 26. In various embodiments, the carrier aggregation scheduler is located in base station 20, or separate from (but in communication with) base station 20. In various embodiments where the cellular network 10 includes a separate base station for each of cells 12, 14, for example, the carrier aggregation scheduler is in communication with both base stations, or is located in one base station and remotely in communication with the other base station. The carrier aggregation scheduler is discussed further below in connection with FIGS. 2 and 3, and carrier aggregation scheduling techniques implemented by the carrier aggregation scheduler are discussed below in connection with FIGS. 4-6.

Figure 2:
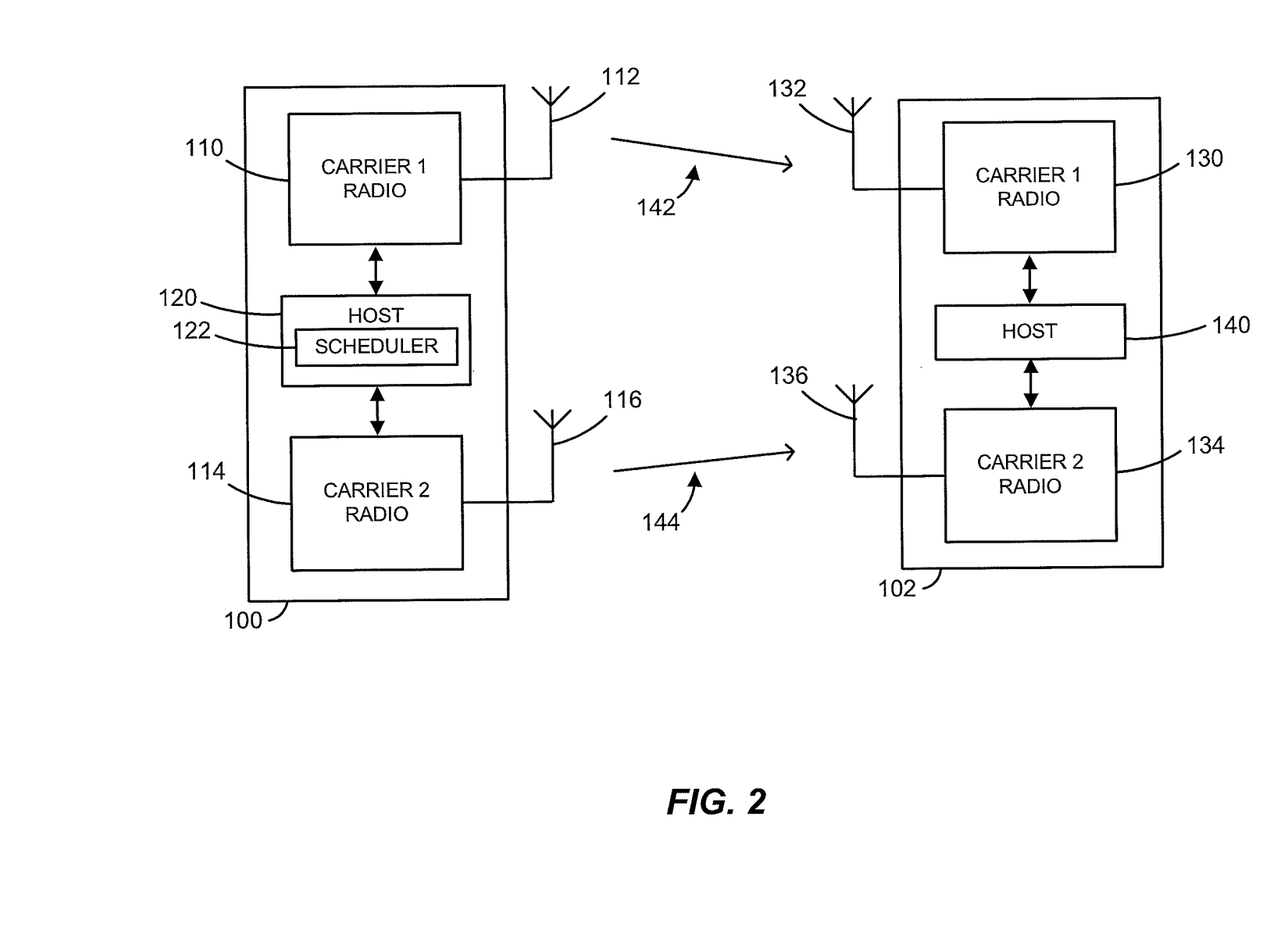
FIG. 2 is a block diagram of an example base station and an example user terminal in a cellular network such as the example cellular network of FIG. 1, according to an embodiment.

FIG. 2 is a block diagram of an example base station 100 and an example user terminal 102 in a cellular network such as the example cellular network 10 of FIG. 1, according to an embodiment. In an embodiment, the base station 100 corresponds to the base station 20 of FIG. 1, and the user terminal 102 corresponds to the user terminal 22 of FIG. 1.

The base station 100 includes a first radio 110 and antenna 112 for transmitting via a first component carrier (e.g., the carrier corresponding to cell 12 of FIG. 1), and a second radio 114 and antenna 116 for transmitting via a second component carrier (e.g., the carrier corresponding to cell 14 of FIG. 1). In some embodiments, the radio 110 and antenna 112, and/or the radio 114 and antenna 116, are also used to receive signals from the user terminal 102 via the corresponding carriers. Moreover, in some embodiments (e.g., in multiple input multiple output (MIMO) systems), the antenna 112 includes an array of two or more antennas and the radio 110 includes two or more corresponding transceivers, and/or the antenna 116 includes an array of two or more antennas and the radio 114 includes two or more corresponding transceivers.

The radio 110 for the first component carrier and the radio 114 for the second component carrier are coupled to a host 120, which includes one or more processors, in an embodiment. The host 120 includes a carrier aggregation scheduler 122 configured to implement carrier aggregation scheduling techniques, such as any of the example techniques described below in connection with FIGS. 4-6. In alternative embodiments, the carrier aggregation scheduler 122 is not included in host 120, and/or is not included in base station 100. In one embodiment, for example, the carrier aggregation scheduler 122 is included in a device in a backbone system that communicates with base station 100. In one alternative embodiment, radio 110 and antenna(s) 112 are included in base station 100 while radio 114 and antenna(s) 116 are included in a second base station (not seen in FIG. 2), with both base stations being in communication with the carrier aggregation scheduler 122.

In yet another alternative embodiment, the base station 20 and/or additional base stations include radios and corresponding antennas that support three or more component carriers. In one embodiment, for example, the base station 100 includes a third radio and corresponding antenna(s), with the third radio also being in communication with the host 120 and carrier aggregation scheduler 122. In another example embodiment, three base stations each include a radio and antenna(s) corresponding to different component carriers, with each of the three base stations being in communication with the carrier aggregation scheduler 122.

The user terminal 102 includes a first radio 130 and antenna 132 for transmitting and receiving via the first component carrier (i.e., the carrier corresponding to radio 110), and a second radio 134 and antenna 136 for transmitting and receiving via the second component carrier (i.e., the carrier corresponding to radio 114). In some embodiments, as with the radios 110, 114 and antennas 112, 116 of base station 100, the radio 130 and/or the radio 134 include(s) multiple transceivers, and/or the antenna 132 and/or the antenna 136 include(s) an array of two or more antennas. Moreover, for embodiments in which three or more component carriers may be aggregated, the user terminal 102 includes additional radios and antennas corresponding to the additional carriers. The radio 130 for the first component carrier and the radio 134 for the second component carrier are coupled to a host 140 configured to manage operation of the radios 130, 134, in an embodiment. In one embodiment, the host 140 includes one or more processors (not seen in FIG. 2).

The radio 110 and antenna(s) 112 of base station 100 send traffic streams to the antenna(s) 132 and radio 130 of user terminal 102 via the first component carrier over a downlink 142 (e.g., similar to downlink 24 of FIG. 1). Similarly, the radio 114 and antenna(s) 116 of base station 100 send traffic streams to the antenna(s) 136 and radio 134 of user terminal 102 via the second component carrier over a downlink 144 (e.g., similar to downlink 26 of FIG. 1).

In an embodiment, the carrier aggregation scheduler 122 schedules the packets of a particular traffic stream to be transmitted via a single cell/carrier for the life of the traffic stream, as described further below with reference to FIGS. 3-6. As a result, the design of the user terminal 102 may be simplified. In particular, and unlike other more complex carrier aggregation schemes, the radios 130 and 134 of user terminal 102 need not share higher layers, or share storage buffers, in an embodiment. In some embodiments, for example, the radios 130 and 134 are independent at least at the PHY, medium access control (MAC), and radio link control and packet data convergence protocol (RLC/PDCP) layers.

Figure 3:
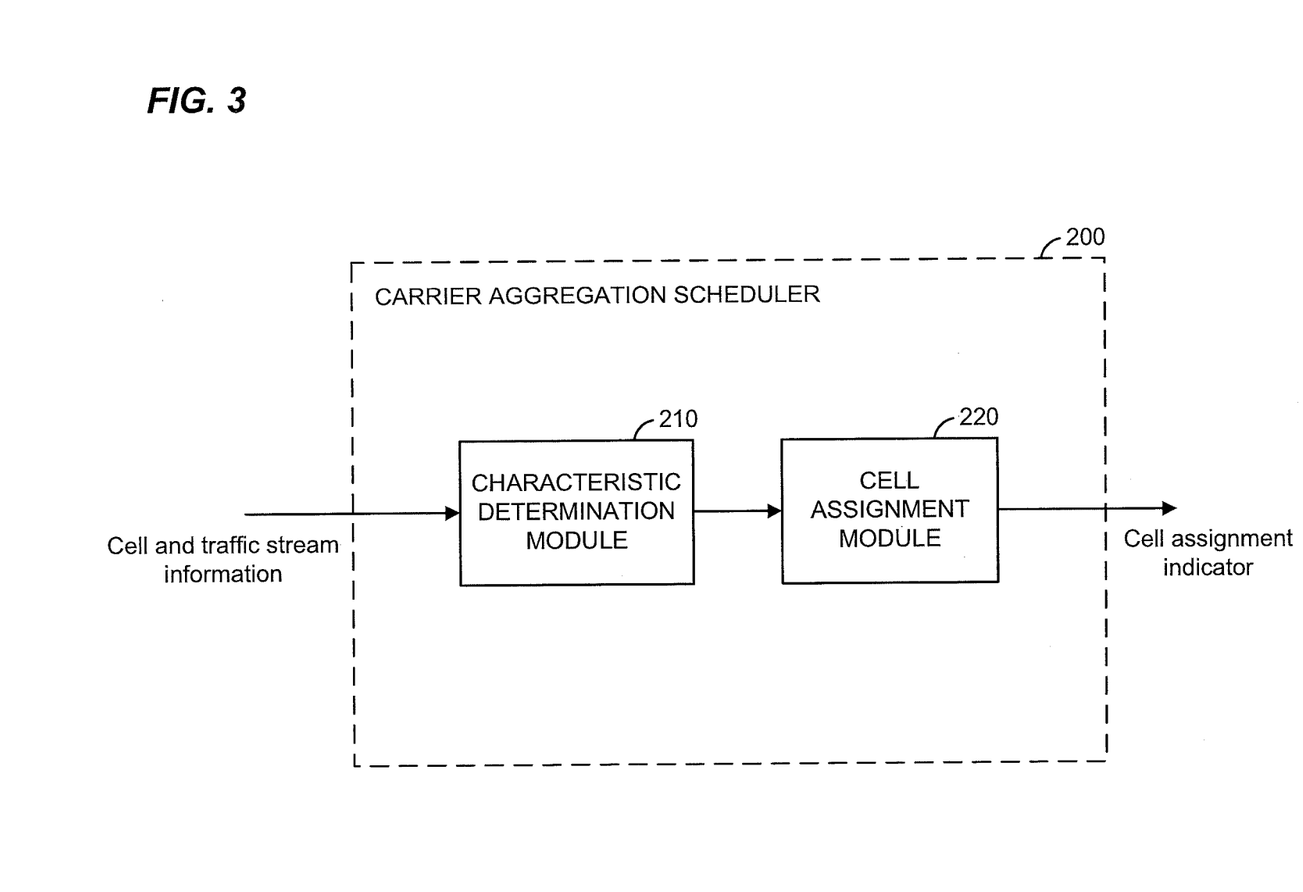
FIG. 3 is a block diagram of an example carrier aggregation scheduler, according to an embodiment.

FIG. 3 is a block diagram of an example carrier aggregation scheduler 200, according to an embodiment. In an embodiment, the carrier aggregation scheduler 200 is utilized as the carrier aggregation scheduler 122 of FIG. 2. The carrier aggregation scheduler 200 includes a characteristic determination module 210 coupled to a cell assignment module 220. The characteristic determination module 210 accepts as inputs information relating to two or more cells to be aggregated, as well as one or more traffic streams. In one embodiment, for example, the characteristic determination module 210 accepts information indicative of characteristics of the first cell 12 of FIG. 1 (corresponding to downlink 24 of FIG. 1 or downlink 142 of FIG. 2) and one or more characteristics of the second cell 14 of FIG. 1 (corresponding to downlink 26 of FIG. 1 or downlink 144 of FIG. 2), as well as information indicative of characteristics of one or more traffic streams to be assigned to one of cells 12, 14. The characteristic determination module 210 receives the information associated with the various cell and traffic streams in response to one or more requests, in an embodiment. In other embodiments, the information is provided to the characteristic determination module 210 automatically (e.g., on a periodic basis, or whenever a portion of the information changes, etc.).

In an embodiment, the characteristics of a cell (also referred to herein as "cell characteristics") determined from the cell information by characteristic determination module 210 include characteristics such as the capacity, coverage area, user load, and/or channel quality of the corresponding cell. For example, in various different embodiments, the characteristics for a given cell include any one or more of channel bandwidth, coverage area (e.g., coverage distance), frequency, neighbor cell interference, signal propagation (e.g., free space attenuation associated with the component carrier of the cell, scattering, etc.), average number of users and/or streams served, and/or channel state information (e.g., channel state information fed back to a base station of the cell). In an embodiment, the information pertaining to each cell is received from a radio corresponding to that cell, such as radio 110 or radio 114 of FIG. 2, for example.

In an embodiment, characteristics of a traffic stream (also referred to herein as "traffic stream characteristics") include desired characteristics for the corresponding traffic stream (e.g., as indicated by a higher layer that originated the traffic stream). In an embodiment, for example, the characteristics for a given traffic stream include a quality of service metric, such as a maximum permissible packet error rate, and/or a maximum permissible packet delay, etc. In some embodiments, a traffic stream is identified by one or more parameters or identifiers common to all packets within the traffic stream. In one embodiment within a 3GPP LTE cellular network, for example, each traffic stream is defined by a particular data radio bearer and/or logical channel corresponding to that traffic stream. In an embodiment, a data radio bearer and logical channel are defined and controlled at a radio resource control (RRC) layer. In one such embodiment, RRC messages configure the data radio bearers and logical channels of the traffic streams, and notify users accordingly.

After determining both the cell characteristics and traffic stream characteristics from the received information, the characteristic determination module 210 provides the characteristics to the cell assignment module 220. For each traffic stream, the cell assignment module 220 selects a cell from the two or more candidate cells (e.g., cells 12 and 14 of FIG. 1). The selection is made based on the cell characteristics received from the characteristic determination module 210, and based on the characteristics of the traffic stream(s) that are also received from the characteristic determination module 210, in an embodiment. The selection process is described in further detail below in connection with FIGS. 4-6 for various different embodiments. Once a cell is selected, the cell assignment module 220 assigns the selected cell to the corresponding traffic stream, and outputs an indicator of the cell assignment, in an embodiment. In one embodiment, the cell assignment indicator causes the base station (e.g., base station 100 of FIG. 2) to direct all packets of the traffic stream to a radio associated with the selected cell (e.g., radio 110 or radio 114 of FIG. 2) for transmission to a user terminal (e.g., user terminal 102 of FIG. 1). In some embodiments, the cell assignment indicator also causes the base station to announce to the user terminal which carrier/cell will be utilized.

In some embodiments, the characteristic determination module 210 provides cell characteristics to cell assignment module 220 at a different rate than traffic stream characteristics. In various different embodiments, for example, the characteristic determination module 210 provides cell characteristics to cell assignment module 220 on a periodic basis, or as the cell characteristics change, and provides traffic stream characteristics to cell assignment module 220 as each new traffic stream is identified.

In some embodiments and/or scenarios, the cell assignment module 220 selects cells for only one traffic stream at a time, independently of other traffic streams. In other embodiments and/or scenarios, however, the cell assignment module 220 selects cells for two or more traffic streams by jointly considering the characteristics of the various streams. In one embodiment where the cell assignment module 220 ranks cells and ranks traffic streams, for example, the cell assignment module 220 maps multiple traffic streams to cells according to the traffic stream ranks and cell ranks, as discussed further below with reference to the example embodiment of FIG. 6.

In some embodiments and/or scenarios, control channels (e.g., a PDCCH control channel for 3GPP LTE) can be sent via multiple component carriers even when an associated traffic stream is assigned to only a single cell/carrier, in order to provide more robust performance to user terminals at cell edges and/or to user terminals experiencing high levels of interference. In other embodiments, control channels are restricted to the same cell that an associated traffic stream has been assigned to. In this latter embodiment, network scheduling and user terminal receiver design may be further simplified.

Figure 4:
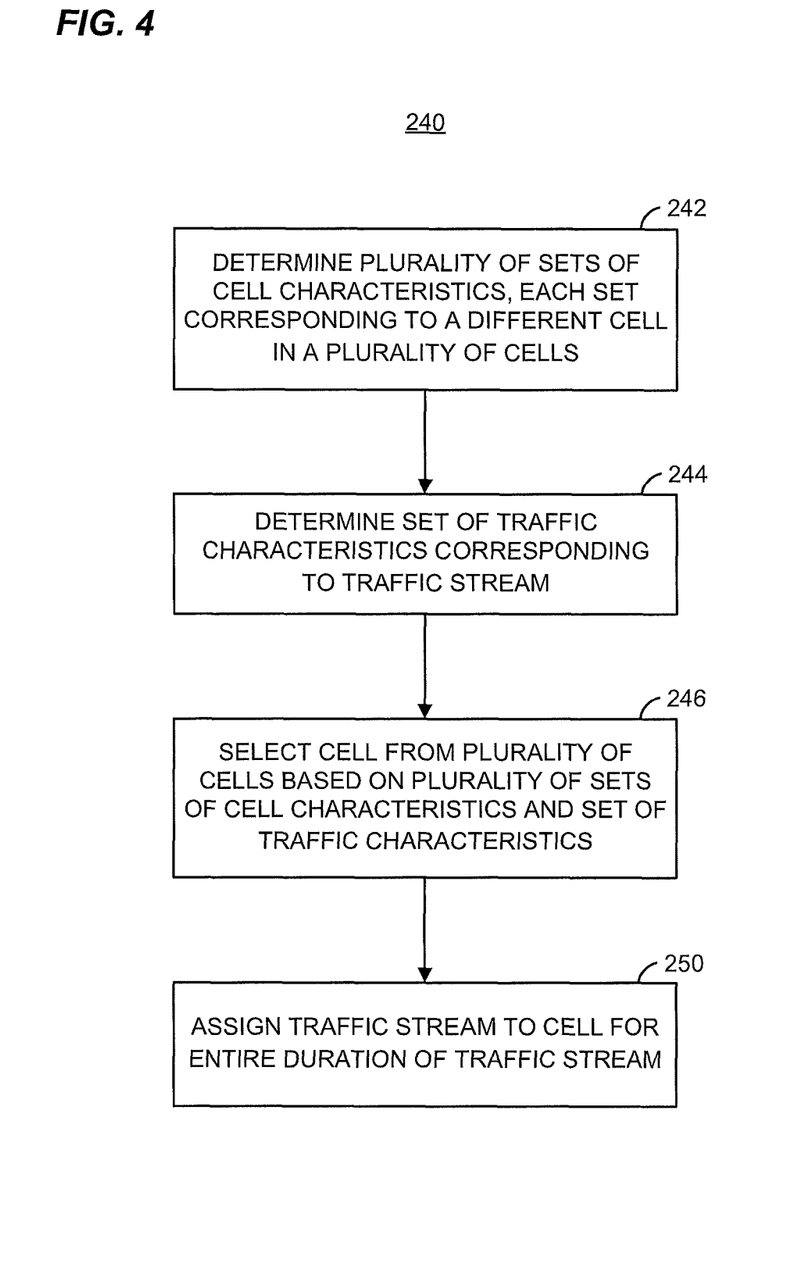
FIG. 4 is a flow diagram of an example method for carrier aggregation scheduling in a communication network, according to an embodiment.

FIG. 4 is a flow diagram of an example method 240 for carrier aggregation scheduling in a communication network, according to an embodiment. In various embodiments, the method 240 is implemented by the carrier aggregation scheduler 122 of FIG. 2 or the carrier aggregation scheduler 200 of FIG. 3. In some embodiments, the method 240 is implemented by one or more processors executing instructions stored in a computer readable medium such as a volatile or non-volatile memory.

At block 242, a plurality of sets of cell characteristics is determined. Each set of cell characteristics corresponds to a different cell of a plurality of cells, with each cell corresponding to a different component carrier, in an embodiment. In one embodiment and/or scenario, for example, the plurality of cells includes two cells and the plurality of sets of cell characteristics includes a first set of characteristics corresponding to one of the cells and a second set of characteristics corresponding to the other of the cells.

Each set of cell characteristics includes one or more different metrics or parameters associated with the corresponding cell, in an embodiment. In one embodiment, for example, each set of cell characteristics includes a bandwidth (e.g., a channel bandwidth) of the corresponding cell. In another embodiment, each set of cell characteristics includes a coverage metric of the corresponding cell, such as coverage distance or coverage area, for example. In another embodiment, each set of cell characteristics includes a frequency of the corresponding cell, such as the center frequency of the component carrier associated with the cell, for example. In another embodiment, each set of cell characteristics includes an interference metric of the corresponding cell, such as a level of interference from neighboring cells, for example. In another embodiment, each set of cell characteristics includes a signal propagation metric of the corresponding cell, such as free space attenuation of the associated component carrier and/or scattering metrics or parameters, for example. In another embodiment, each set of cell characteristics includes a cell usage metric of the corresponding cell, such as an average and/or total number of users or traffic streams served in the cell, for example. In another embodiment, each set of cell characteristics includes channel state information of the corresponding cell, such as channel state information (e.g., signal-to-noise ratio, noise power, etc.) that is fed back to a base station of the cell by one or more user terminals, for example. In still other embodiments, each set of cell characteristics includes two or more of the example cell characteristics listed above.

At block 244, a set of traffic characteristics corresponding to a traffic stream is determined. In an embodiment, each "traffic stream" corresponds to a different data radio data bearer, to a different logical channel, or to a different combination of data radio bearer and logical channel. In some embodiments, the traffic characteristics determined at block 244 include one or more desired quality of service (QoS) metrics that correspond to the traffic stream, such as a maximum permissible packet error rate, and/or a maximum permissible packet delay, for example. In an embodiment, the traffic characteristics determined at block 244 correspond in some way to the cell characteristics determined at block 242. For example, in one embodiment where the cell characteristics include expected average packet delays for each cell, the traffic characteristics include maximum permissible packet delays. As another example, in one embodiment where the cell characteristics include an expected average number of data bytes per symbol for each cell, the traffic characteristics include a number of data bytes to transmit, a minimum permissible throughput, or some other characteristic related to desired throughput or spectral efficiency.

At block 246, a cell is selected from the plurality of cells based on the plurality of sets of cell characteristics (determined at block 242) and the set of traffic characteristics (determined at block 244). In one embodiment, cell selection at block 246 includes determining a threshold based on the sets of cell characteristics (determined at block 242) and determining a score based on the set of traffic characteristics (determined at block 244), and then comparing the score to the threshold in order to identify which cell is to be selected. Examples of this embodiment are provided below with reference to FIG. 5. In another embodiment, cell selection at block 246 includes determining a cell rank for each cell based on the sets of cell characteristics (determined at block 242) and determining a rank for the traffic stream based on the set of traffic characteristics (determined at block 244), and then selecting a cell based on the cell ranks and the traffic stream rank. Examples of this embodiment are provided below with reference to FIG. 6. In some embodiments, cells can be selected for more than one traffic stream at a time. In other embodiments, cells can only be selected for a single traffic stream at a time.

At block 250, the traffic stream is assigned to the selected cell (selected at block 246) for the entire duration of the traffic stream, such that the cell assignment for the traffic stream cannot be changed mid-stream. In various embodiments, the "entire duration" of the traffic stream includes all PHY packets (and/or other layer packets, in some embodiments) corresponding to the traffic stream. In some embodiments, assigning the traffic stream to the selected cell at block 250 includes generating an indicator, which is then provided to one or more other units (e.g., other units within a base station implementing the method 240) that direct the traffic stream to the appropriate radios (e.g., to the appropriate transceiver, antenna, etc.). Moreover, in some embodiments, assigning the traffic stream to the selected cell at block 250 includes transmitting to a user terminal, or causing to be transmitted to a user terminal, a message that indicates the cell via which the traffic stream will be sent to the user terminal.

In some embodiments, the method 240 occurs in a different order than shown. In some embodiments, for example, block 242 occurs after, and/or simultaneously with, block 244. Moreover, in some embodiments, some or all of the blocks of method 240 are repeated multiple times. In one embodiment, for example, successive iterations of block 242 determine updated characteristics for each cell. In various embodiments, the updated characteristics are determined periodically, as cell characteristics change, on request from a scheduler implementing the method 240, or on any other suitable basis or schedule. In another example embodiment, block 242 is repeated (to determine updated cell characteristics) each time the blocks 244 through 250 are repeated for a new traffic stream. In some embodiments, block 242 is repeated on a different schedule than blocks 244 through 250, and/or is repeated a different number of times than blocks 244 through 250. In one embodiment, for example, block 242 is repeated in response to changes in cell characteristics, while blocks 244 through 250 are repeated for each new traffic stream.

Figure 5:
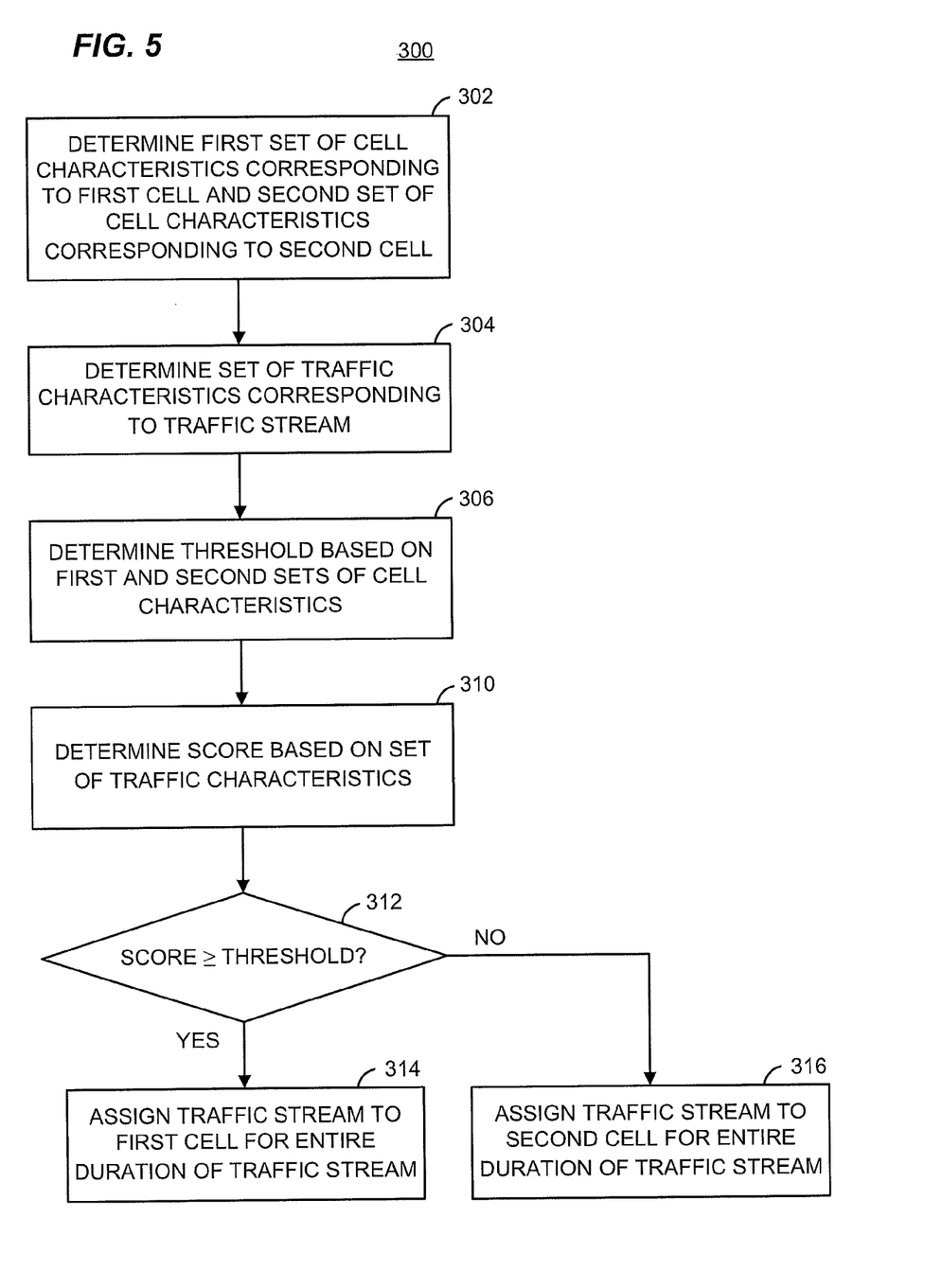
FIG. 5 is a flow diagram of an example method for threshold-based carrier aggregation scheduling in a communication network, according to an embodiment.
Figure 6:
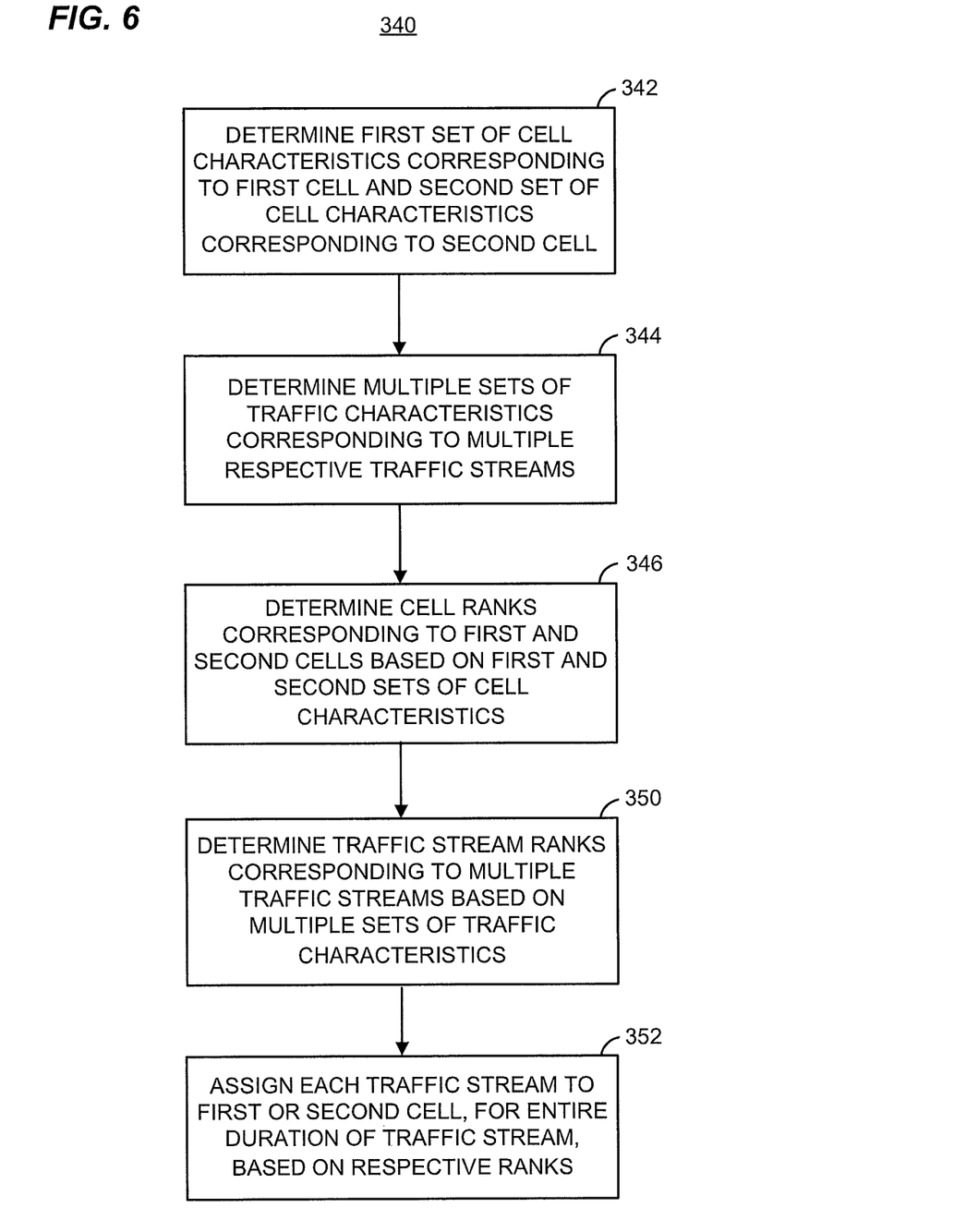
FIG. 6 is a flow diagram of an example method for rank-based carrier aggregation scheduling in a communication network, according to an embodiment.

FIGS. 5 and 6 show more detailed example embodiments of the carrier aggregation scheduling technique of method 240.

FIG. 5 is a flow diagram of an example method 300 for threshold-based carrier aggregation scheduling in a communication network, according to an embodiment. In various embodiments, the method 300 is implemented by the carrier aggregation scheduler 122 of FIG. 2 or the carrier aggregation scheduler 200 of FIG. 3. In some embodiments, the method 300 is implemented by one or more processors executing instructions stored in a computer readable medium such as a volatile or non-volatile memory.

At block 302, a first set of cell characteristics corresponding to a first cell and a second set of cell characteristics corresponding to a different, second cell are determined. Block 302 is similar to block 242 of method 240 in FIG. 5, in an embodiment.

At block 304, a set of traffic characteristics corresponding to a traffic stream is determined. Block 302 is similar to block 242 of method 240 in FIG. 5, in an embodiment.

At block 306, a threshold is determined based on the first and second sets of cell characteristics determined at block 302. In one embodiment, for example, the threshold is calculated at block 306 based on a bandwidth of each cell, an expected average number of bits per symbol for each cell, and an average number of streams served in each cell, according to formula:

$$\text{threshold} = \min\{(BW_1 * E[N_{bps,1}]/N_{s,1}), (BW_2 * E[N_{bps,2}]/N_{s,2})\}, \quad \text{(Equation 1)}$$

where $BW_i$ is the bandwidth of cell i, $E[N_{bps,i}]$ is the expected average number of bits per symbol for cell i, and $N_{s,i}$ is the average number of streams served in cell i.

In another example embodiment, the threshold is determined at block 306 based on the packet error loss rate (PER) that each cell can provide. In one embodiment, the PER that each cell can provide corresponds to a QoS class identifier (QCI) of the cell, e.g., according to the table:

TABLE 1

| QoS Class Identifier (QCI) | Packet Delay Budget | Packet Error Loss Rate (PER) | Example Services |
|---|---|---|---|
| 1 | 100 ms | $10^{-2}$ | Conversational voice |
| 2 | 150 ms | $10^{-3}$ | Conversational video (live streaming) |
| 3 | 50 ms | $10^{-3}$ | Real-time gaming |
| 4 | 300 ms | $10^{-6}$ | Non-conversational video (buffered streaming) |
| 5 | 100 ms | $10^{-6}$ | IMS (IP multimedia subsystem) signaling |
| 6 | 300 ms | $10^{-6}$ | Video (buffered streaming) TCP-based (e.g., www, e-mail, chat, ftp, p2p file sharing, progressive video, etc.) |
| 7 | 100 ms | $10^{-3}$ | Voice Video (live streaming) Interactive gaming |
| 8 or 9 | 300 ms | $10^{-6}$ | Video (buffered streaming) TCP-based (e.g., www, e-mail, chat, ftp, p2p file sharing, progressive video, etc.) |

In one embodiment, for example, the threshold is determined at block 306 by selecting a PER threshold that is between the PER(s) supported by a first cell and the PER(s) supported by a second cell (e.g., selecting a PER threshold of $10^{-4}$ where a first cell and a second cell support PERs of $10^{-3}$ and $10^{-6}$, respectively, in one scenario and embodiment).

At block 310, a score is determined for the traffic stream based on the set of traffic characteristics determined at block 304. In one embodiment, for example, the score of traffic stream j, $TS_j$, is calculated according to the formula:

$$TS_j = N_{bits\_lat,j}/L_j, \quad \text{(Equation 2)}$$

where $L_j$ is the required latency for traffic stream j, and $N_{bits\_lat,j}$ is the number of data bits in traffic stream j during the required latency $L_j$. In another example embodiment, the score of traffic stream j is calculated according to the formula:

$$TS_j = PER_{QCI,j}, \quad \text{(Equation 3)}$$

where $PER_{QCI,j}$ is the packet error loss rate corresponding to the QCI of traffic stream j.

At block 312, it is determined whether the score (determined at block 310) is greater than or equal to the threshold (determined at block 306). In various other embodiments, it is instead determined whether the score is greater than the threshold, less than the threshold, or less than or equal to the threshold. In one embodiment where the threshold is equal or proportional to a channel noise power, for example, it is determined at block 312 whether the score for the traffic stream is less than (or less than or equal to) the threshold.

In the example method 300, the "first cell" (for which characteristics were determined at block 302) corresponds to the cell better matched to a traffic stream with a score equal to or greater than the threshold determined at block 306. For example, in an embodiment and scenario where the threshold determined at block 306 is equal to the average bandwidth of the first and second cells, and where the first and second cells have bandwidths of 20 MHz and 10 MHz, respectively, the first cell is better matched to traffic streams with a "score" (desired bandwidth) greater than the threshold (15 MHz) than the second cell. Thus, if it is determined at block 312 that the score is greater than or equal to (or, in some embodiment, simply greater than) the threshold, flow proceeds to block 314. At block 314, the traffic stream is assigned to the first cell for the entire duration of the traffic stream. If it is instead determined at block 312 that the score is less than the threshold, flow proceeds to block 316. At block 316, the traffic stream is assigned to the second cell for the entire duration of the traffic stream.

As with method 240 of FIG. 5, the method 300 occurs in a different order than shown, and/or is repeated for multiple iterations, in various different embodiments and scenarios. Moreover, in some embodiments, the method 300 determines a set of characteristics for three or more cells at block 302, determines the threshold based on the three or more sets of cell characteristics at block 306, and utilizes a larger decision tree in place of blocks 312, 314 and 316. In one embodiment, for example, the score of a traffic stream is compared to two or more thresholds to select a cell to be assigned to the traffic stream.

In some embodiments, the threshold determined at block 306 is fixed. In other embodiments, the threshold determined at block 306 is time-varying (e.g., updated in real-time, or semi-statically). In one embodiment, for example, the threshold is updated in response to changes in cell characteristics.

Two example scenarios corresponding to the method 300 are now provided, according to different embodiments. A first example corresponds to an embodiment in which the threshold is calculated according to Equation 1 above, and the score for each of two traffic streams is calculated according to Equation 2 above. In this example, it is determined at block 302 that a first cell (e.g., with a smaller coverage area) has a 10 MHz bandwidth and a second cell (e.g., with a larger coverage area) has a 5 MHz bandwidth. It is also determined at block 302 that the first cell has an expected modulation and coding scheme (MCS) of 64-quadrature amplitude modulation (64QAM) with ¾ rate coding and 2×2 MIMO, an expected average number of bits per symbol of 4.5, and an average number of served streams of 10, and that the second cell has an expected MCS of 16QAM with ½ rate coding, an expected average number of bits per symbol of 2, and an average number of served streams of 20. Thus, the threshold is calculated (at block 306) as:

$$\text{threshold} = \min\{(10\,M * 4.5 * 2/10), (5\,M * 2/20)\} = \min\{9\,M, 500\,k\} = 500\,k, \quad \text{(Equation 4)}$$

Also in this example scenario, two types of traffic streams are identified as being destined for the user terminal: a high-definition (HD) video stream and a voice-over-IP (VoIP) stream. In two iterations of block 304, it is determined that the HD video stream has a required latency of 20 ms during which 12,000 data bits would be transmitted, and that the VoIP stream has a required latency of 20 ms during which 1,600 data bits would be transmitted. Thus, in corresponding iterations of block 310, a score of $12,000/20 * 10^{-3} = 600,000$ is determined for the HD video stream, and a score of $1,600/20 * 10^{-3} = 80,000$ is determined for the VoIP stream. The comparison in corresponding iterations of block 312 determines that 600,000 is greater than the threshold of 500,000, which causes the HD video stream to be assigned to the first cell at block 314, and that 80,000 is less than the threshold of 500,000, which causes the VoIP stream to be assigned to the second cell at block 316.

A second example corresponds to an embodiment in which the threshold is determined by selecting a PER threshold that is between the PERs supported by two different cells, and the score for each of two traffic streams is calculated according to Equation 3 above. In this example scenario, it is determined at block 302 that the first cell can support QCIs of 1, 2, 3 and 7 in Table 1 above (i.e., a $10^{-3}$ or worse PER), and the second cell can support QCIs of 4, 5, 6, 8 and 9 in Table 1 (i.e., a $10^{-6}$ or worse PER). Thus, in this example, the threshold is determined (at block 306) to be a PER between $10^{-3}$ and $10^{-6}$. In this particular example, the threshold is determined (e.g., by a particular algorithm or predetermined mapping) to be a PER of $10^{-4}$.

Also in this example scenario, two types of traffic streams are identified as being destined for the user terminal: an HD video stream and a VoIP stream. The HD video requires QCI 6 according to Table 1 (corresponding to a PER of $10^{-6}$), and the VoIP stream requires QCI 1 according to Table 1 (corresponding to a PER of $10^{-2}$). Thus, in two iterations of block 310, it is determined that the HD video stream has a score of $10^{-6}$, and that the VoIP stream has a score of $10^{-2}$. In corresponding iterations of block 312, it is determined that $10^{-6}$ is less than the threshold of $10^{-4}$, which causes the HD video stream to be assigned to the second cell at block 316, and that $10^{-2}$ is greater than the threshold of $10^{-4}$, which causes the VoIP stream to be assigned to the first cell at block 314.

FIG. 6 is a flow diagram of an example method 340 for rank-based carrier aggregation scheduling in a communication network, according to an embodiment. In various embodiments, the method 340 is implemented by the carrier aggregation scheduler 122 of FIG. 2 or the carrier aggregation scheduler 200 of FIG. 3. In some embodiments, the method 340 is implemented by one or more processors executing instructions stored in a computer readable medium such as a volatile or non-volatile memory.

At block 342, a first set of cell characteristics corresponding to a first cell and a second set of cell characteristics corresponding to a different, second cell are determined. In an embodiment, block 342 is similar to block 302 of method 300 in FIG. 5.

At block 344, multiple sets of traffic characteristics corresponding to multiple respective traffic streams are determined. In an embodiment, block 344 is similar to block 304 of method 300 in FIG. 5, but for multiple traffic streams. In various embodiments, each of the traffic streams is a traffic stream that has arrived simultaneously, or has arrived within a single time period that is sufficiently short to cause the method 340 to jointly consider the traffic streams for cell assignment.

At block 346, cell ranks are determined for the first cell and the second cell based on the first and second sets of cell characteristics determined at block 342. In one embodiment where total data loads are determined at block 342, for example, the first and second cells are ranked such that the cell with the lowest total data load has the highest rank.

At block 350, ranks are determined for each of the multiple traffic streams based on the multiple sets of traffic characteristics determined at block 344. In one embodiment where the traffic characteristics include total number of data bytes for the traffic stream, for example, the traffic streams are ranked such that the stream with the largest total number of data bytes has the highest rank.

At block 352, each of the multiple traffic streams is assigned to the first cell or the second cell for the entire duration of the respective traffic stream. In one embodiment, each traffic stream is assigned to the cell of like rank (i.e., highest ranked traffic stream to highest ranked cell, and second-highest ranked traffic stream to second-highest ranked cell, etc.). In some embodiments where there are more traffic streams than cells, all traffic streams ranked as low or lower than the lowest-ranked cell are assigned to the lowest-ranked cell.

As with method 240 of FIG. 5, the method 340 occurs in a different order than shown in some embodiments and/or scenarios. Moreover, in some embodiments, only a single traffic stream is assigned to a cell in the method 340. In one such embodiment and/or scenario, the traffic stream is automatically assigned to the highest-ranked cell. Further, in some embodiments and/or scenarios, the method 340 assigns each traffic stream to one of three or more ranked cells.

In some embodiments, the ranks determined at block 346 are fixed. In other embodiments, the ranks determined at block 346 are time-varying (e.g., updated in real-time, or semi-statically). In one embodiment, for example, the ranks are updated in response to changes in cell characteristics.

An example scenario corresponding to the method 340 is now provided, according to a "load balancing" embodiment in which cells are ranked according to total number of bytes queued and served, and traffic streams are ranked according to total number of data bytes in the various traffic streams. In this example embodiment and scenario, it is determined at block 342 that a first cell has 1.002 gigabytes served and queued, while a second cell has 1 gigabyte served and queued. Thus, at block 346, the second cell is ranked "rank 1" and the first cell is ranked "rank 2." Also in this example embodiment and scenario, it is determined at block 344 that an email traffic stream (e.g., with an attachment) has 5 megabytes of data, another email stream (e.g., plain text only) has 25 kilobytes of data, and yet another email stream (e.g., also plain text only) has 10 kilobytes of data. Thus, at block 350, it is determined that the 5 megabyte stream is "rank 1," the 25 kilobytes stream is "rank 2," and the 10 kilobyte stream is "rank 3." Accordingly, in an embodiment where traffic streams ranked lower than the lowest-ranked cell are assigned to the lowest-ranked cell, at block 352 the 5 megabyte stream is assigned to the first cell, the 25 kilobyte stream is assigned to the second cell, and the 10 kilobyte stream is also assigned to the second cell.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

Further aspects of the present invention relate to one or more of the following clauses.

In one embodiment, a method, implemented by one or more processors, for scheduling traffic streams in a communication network, includes determining, via a processor, a plurality of sets of one or more cell characteristics. Each set of cell characteristics in the plurality of sets of cell characteristics corresponds to a different cell in a plurality of cells. The method also includes determining, via a processor, a first set of one or more traffic characteristics corresponding to a first traffic stream, selecting, via a processor, a first cell from the plurality of cells based on (i) the plurality of sets of cell characteristics and (ii) the first set of traffic characteristics, and assigning, via a processor, the first traffic stream to the first cell for an entire duration of the first traffic stream.

In other embodiments, the method includes one or more of the following features.

Determining, via a processor, a second set of one or more traffic characteristics corresponding to a second traffic stream, selecting, via a processor, a second cell from the plurality of cells based on (i) the plurality of sets of cell characteristics and (ii) the second set of traffic characteristics, and assigning, via a processor, the second traffic stream to the second cell for an entire duration of the second traffic stream.

The first traffic stream corresponds to one or both of (i) a first data radio bearer and (ii) a first logical channel, and the second traffic stream corresponds to one or both of (i) a second data radio bearer different than the first data radio bearer and (ii) a second logical channel different than the first logical channel.

Selecting a first cell from the plurality of cells includes determining a threshold based on the plurality of sets of cell characteristics, determining a score based on the first set of traffic characteristics, and comparing the score to the threshold.

Determining a first set of traffic characteristics includes determining one or more desired quality of service metrics corresponding to the first traffic stream.

Determining a plurality of sets of cell characteristics includes determining one or more of (i) a bandwidth of each cell in the plurality of cells, (ii) a coverage metric of each cell in the plurality of cells, (iii) a frequency of each cell in the plurality of cells, (iv) an interference metric of each cell in the plurality of cells, (v) a signal propagation metric of each cell in the plurality of cells, (vi) a cell usage metric of each cell in the plurality of cells, and (vii) channel state information of each cell in the plurality of cells.

Selecting a first cell from the plurality of cells includes determining a plurality of cell ranks based on the plurality of sets of cell characteristics, where each cell rank in the plurality of cell ranks corresponds to a different cell in the plurality of cells, determining a first traffic stream rank based on the first set of traffic characteristics, and selecting the first cell from the plurality of cells based on (i) the plurality of cell ranks and (ii) the first traffic stream rank.

Selecting the first cell from the plurality of cells includes selecting a cell having a cell rank equal to the first traffic stream rank.

Determining, via a processor, a second set of one or more traffic characteristics corresponding to a second traffic stream, determining, via a processor, a second traffic stream rank corresponding to the second traffic stream, selecting, via a processor, a second cell from the plurality of cells based on (i) the plurality of cell ranks and (ii) the second traffic stream rank, and assigning, via a processor, the second traffic stream to the second cell for an entire duration of the second traffic stream.

Determining a first set of one or more traffic characteristics includes determining one or more desired quality of service metrics corresponding to the first traffic stream.

Determining a plurality of sets of cell characteristics includes determining one or more of (i) a bandwidth of each cell in the plurality of cells, (ii) a coverage metric of each cell in the plurality of cells, (iii) a frequency of each cell in the plurality of cells, (iv) an interference metric of each cell in the plurality of cells, (v) a signal propagation metric of each cell in the plurality of cells, (vi) a cell usage metric of each cell in the plurality of cells, and (vii) channel state information of each cell in the plurality of cells.

Determining, via a processor, a plurality of updated sets of one or more cell characteristics, wherein each updated set of cell characteristics in the plurality of updated sets of cell characteristics corresponds to a different cell in the plurality of cells, determining, via a processor, a second set of one or more traffic characteristics corresponding to a second traffic stream after determining the plurality of updated sets of cell characteristics, selecting, via a processor, a second cell from the plurality of cells based on (i) the plurality of updated sets of cell characteristics and (ii) the second set of traffic characteristics, and assigning, via a processor, the second traffic stream to the second cell for an entire duration of the second traffic stream.

In another embodiment, an apparatus for scheduling traffic streams in a communication network includes a characteristic determination module configured to determine a plurality of sets of one or more cell characteristics, wherein each set of cell characteristics in the plurality of sets of cell characteristics corresponds to a different cell in a plurality of cells. The characteristic determination module is also configured to determine a first set of one or more traffic characteristics corresponding to a first traffic stream. The apparatus also includes a cell assignment module configured to select a first cell from the plurality of cells based on (i) the plurality of sets of cell characteristics and (ii) the first set of traffic characteristics, and assign the first traffic stream to the first cell for an entire duration of the first traffic stream.

In other embodiments, the apparatus includes one or more of the following features.

The cell assignment module is configured to select the first cell from the plurality of cells at least in part by determining a threshold based on the plurality of sets of cell characteristics, determining a score based on the first set of traffic characteristics, and comparing the score to the threshold.

The cell assignment module is configured to select the first cell from the plurality of cells at least in part by determining a plurality of cell ranks based on the plurality of sets of cell characteristics, wherein each cell rank in the plurality of cell ranks corresponds to a different cell in the plurality of cells, determining a first traffic stream rank based on the first set of traffic characteristics, and selecting the first cell from the plurality of cells based on (i) the plurality of cell ranks and (ii) the first traffic stream rank.

The cell assignment module is configured to select the first cell from the plurality of cells at least in part by selecting a cell having a cell rank equal to the first traffic stream rank.

The characteristic determination module is configured to determine the first set of one or more traffic characteristics at least in part by determining one or more desired quality of service metrics corresponding to the first traffic stream.

The characteristic determination module is configured to determine the plurality of sets of cell characteristics at least in part by determining one or more of (i) a bandwidth of each cell in the plurality of cells, (ii) a coverage metric of each cell in the plurality of cells, (iii) a frequency of each cell in the plurality of cells, (iv) an interference metric of each cell in the plurality of cells, (v) a signal propagation metric of each cell in the plurality of cells, (vi) a cell usage metric of each cell in the plurality of cells, and (vii) channel state information of each cell in the plurality of cells.

In another embodiment, an apparatus includes one or more processors and a computer readable medium having stored thereon machine executable instructions. When executed by the one or more processors, the machine executable instructions cause the one or more processors to determine a plurality of sets of one or more cell characteristics. Each set of cell characteristics in the plurality of sets of cell characteristics corresponds to a different cell in a plurality of cells. The machine executable instructions also cause the one or more processors to determine a first set of one or more traffic characteristics corresponding to a first traffic stream, select a first cell from the plurality of cells based on (i) the plurality of sets of cell characteristics and (ii) the first set of traffic characteristics, and assign the first traffic stream to the first cell for an entire duration of the first traffic stream.

In other embodiments, the apparatus includes one or more of the following features.

The machine executable instructions cause the one or more processors to select the first cell from the plurality of cells at least in part by determining a threshold based on the plurality of sets of cell characteristics, determining a score based on the first set of traffic characteristics, and comparing the score to the threshold.

The machine executable instructions cause the one or more processors to select the first cell from the plurality of cells at least in part by determining a plurality of cell ranks based on the plurality of sets of cell characteristics, wherein each cell rank in the plurality of cell ranks corresponds to a different cell in the plurality of cells, determining a first traffic stream rank based on the first set of traffic characteristics, and selecting the first cell from the plurality of cells based on (i) the plurality of cell ranks and (ii) the first traffic stream rank.

The machine executable instructions cause the one or more processors to select the first cell from the plurality of cells at least in part by selecting a cell having a cell rank equal to the first traffic stream rank.

The machine executable instructions cause the one or more processors to determine the first set of traffic characteristics at least in part by determining one or more desired quality of service metrics corresponding to the first traffic stream.

The machine executable instructions cause the one or more processors to determine the plurality of sets of cell characteristics at least in part by determining one or more of (i) a bandwidth of each cell in the plurality of cells, (ii) a coverage metric of each cell in the plurality of cells, (iii) a frequency of each cell in the plurality of cells, (iv) an interference metric of each cell in the plurality of cells, (v) a signal propagation metric of each cell in the plurality of cells, (vi) a cell usage metric of each cell in the plurality of cells, and (vii) channel state information of each cell in the plurality of cells.

What is claimed is:

1. A method for scheduling traffic streams in a communication network, the method comprising:
    determining, via one or more processors, a plurality of sets of one or more cell characteristics, wherein each set of cell characteristics in the plurality of sets of cell characteristics corresponds to a different cell in a plurality of cells;
    determining, via the one or more processors, a first set of one or more traffic characteristics corresponding to a first traffic stream;
    selecting, via the one or more processors, a first cell from the plurality of cells based on (i) the plurality of sets of cell characteristics and (ii) the first set of traffic characteristics, including
        determining a threshold based on the plurality of sets of cell characteristics,
        determining a score based on the first set of traffic characteristics, and
        comparing the score to the threshold; and
    assigning, via the one or more processors, the first traffic stream to the first cell for an entire duration of the first traffic stream.

2. A method according to claim 1, further comprising:
    determining, via the one or more processors, a second set of one or more traffic characteristics corresponding to a second traffic stream;
    selecting, via the one or more processors, a second cell from the plurality of cells based on (i) the plurality of sets of cell characteristics and (ii) the second set of traffic characteristics; and
    assigning, via the one or more processors, the second traffic stream to the second cell for an entire duration of the second traffic stream.

3. A method according to claim 2, wherein:
    the first traffic stream corresponds to one or both of (i) a first data radio bearer and (ii) a first logical channel; and
    the second traffic stream corresponds to one or both of (i) a second data radio bearer different than the first data radio bearer and (ii) a second logical channel different than the first logical channel.

4. A method according to claim 1, wherein determining a first set of traffic characteristics includes determining one or more desired quality of service metrics corresponding to the first traffic stream.

5. A method according to claim 1, wherein determining a plurality of sets of cell characteristics includes determining one or more of (i) a bandwidth of each cell in the plurality of cells, (ii) a coverage metric of each cell in the plurality of cells, (iii) a frequency of each cell in the plurality of cells, (iv) an interference metric of each cell in the plurality of cells, (v) a signal propagation metric of each cell in the plurality of cells, (vi) a cell usage metric of each cell in the plurality of cells, and (vii) channel state information of each cell in the plurality of cells.

6. A method for scheduling traffic streams in a communication network, the method comprising:
 determining, via the one or more processors, a plurality of sets of one or more cell characteristics, wherein each set of cell characteristics in the plurality of sets of cell characteristics corresponds to a different cell in a plurality of cells;
 determining, via the one or more processors, a first set of one or more traffic characteristics corresponding to a first traffic stream;
 selecting, via the one or more processors, a first cell from the plurality of cells based on (i) the plurality of sets of cell characteristics and (ii) the first set of traffic characteristics, including, including
  determining a plurality of cell ranks based on the plurality of sets of cell characteristics, wherein each cell rank in the plurality of cell ranks corresponds to a different cell in the plurality of cells,
  determining a first traffic stream rank based on the first set of traffic characteristics, and
  selecting the first cell from the plurality of cells based on (i) the plurality of cell ranks and (ii) the first traffic stream rank; and
 assigning, via the one or more processors, the first traffic stream to the first cell for an entire duration of the first traffic stream.

7. A method according to claim 6, wherein selecting the first cell from the plurality of cells includes selecting a cell having a cell rank equal to the first traffic stream rank.

8. A method according to claim 6, further comprising:
 determining, via the one or more processors, a second set of one or more traffic characteristics corresponding to a second traffic stream;
 determining, via the one or more processors, a second traffic stream rank corresponding to the second traffic stream;
 selecting, via the one or more processors, a second cell from the plurality of cells based on (i) the plurality of cell ranks and (ii) the second traffic stream rank; and
 assigning, via the one or more processors, the second traffic stream to the second cell for an entire duration of the second traffic stream.

9. A method according to claim 6, wherein determining a first set of one or more traffic characteristics includes determining one or more desired quality of service metrics corresponding to the first traffic stream.

10. A method according to claim 8, wherein determining a plurality of sets of cell characteristics includes determining one or more of (i) a bandwidth of each cell in the plurality of cells, (ii) a coverage metric of each cell in the plurality of cells, (iii) a frequency of each cell in the plurality of cells, (iv) an interference metric of each cell in the plurality of cells, (v) a signal propagation metric of each cell in the plurality of cells, (vi) a cell usage metric of each cell in the plurality of cells, and (vii) channel state information of each cell in the plurality of cells.

11. A method for scheduling traffic streams in a communication network, the method comprising:
 determining, via one or more processors, a plurality of sets of one or more cell characteristics, wherein each set of cell characteristics in the plurality of sets of cell characteristics corresponds to a different cell in a plurality of cells;
 determining, via the one or more processors, a first set of one or more traffic characteristics corresponding to a first traffic stream;
 selecting, via the one or more processors, a first cell from the plurality of cells based on (i) the plurality of sets of cell characteristics and (ii) the first set of traffic characteristics;
 assigning, via the one or more processors, the first traffic stream to the first cell for an entire duration of the first traffic stream;
 determining, via the one or more processors, a plurality of updated sets of one or more cell characteristics, wherein each updated set of cell characteristics in the plurality of updated sets of cell characteristics corresponds to a different cell in the plurality of cells;
 after determining the plurality of updated sets of cell characteristics, determining, via the one or more processors, a second set of one or more traffic characteristics corresponding to a second traffic stream;
 selecting, via the one or more processors, a second cell from the plurality of cells based on (i) the plurality of updated sets of cell characteristics and (ii) the second set of traffic characteristics; and
 assigning, via the one or more processors, the second traffic stream to the second cell for an entire duration of the second traffic stream.

12. An apparatus for scheduling traffic streams in a communication network, the apparatus comprising:
 a characteristic determination module configured to:
  determine a plurality of sets of one or more cell characteristics, wherein each set of cell characteristics in the plurality of sets of cell characteristics corresponds to a different cell in a plurality of cells, and
  determine a first set of one or more traffic characteristics corresponding to a first traffic stream; and
 a cell assignment module configured to:
  select a first cell from the plurality of cells based on (i) the plurality of sets of cell characteristics and (ii) the first set of traffic characteristics at least by
   determining a threshold based on the plurality of sets of cell characteristics,
   determining a score based on the first set of traffic characteristics, and
   comparing the score to the threshold;
 wherein the cell assignment module further is configured to assign the first traffic stream to the first cell for an entire duration of the first traffic stream.

13. An apparatus for scheduling traffic streams in a communication network, the apparatus comprising:
 a characteristic determination module configured to:
  determine a plurality of sets of one or more cell characteristics, wherein each set of cell characteristics in the plurality of sets of cell characteristics corresponds to a different cell in a plurality of cells, and
  determine a first set of one or more traffic characteristics corresponding to a first traffic stream; and
 a cell assignment module configured to:
  select a first cell from the plurality of cells based on (i) the plurality of sets of cell characteristics and (ii) the first set of traffic characteristics at least in part by
   determining a plurality of cell ranks based on the plurality of sets of cell characteristics, wherein each cell rank in the plurality of cell ranks corresponds to a different cell in the plurality of cells,
   determining a first traffic stream rank based on the first set of traffic characteristics, and
   selecting the first cell from the plurality of cells based on (i) the plurality of cell ranks and (ii) the first traffic stream rank;

wherein the cell assignment module is further configured to assign the first traffic stream to the first cell for an entire duration of the first traffic stream.

14. An apparatus according to claim 13, wherein the cell assignment module is configured to select the first cell from the plurality of cells at least in part by selecting a cell having a cell rank equal to the first traffic stream rank.

15. An apparatus for scheduling traffic streams in a communication network, the apparatus comprising:
a characteristic determination module configured to:
determine a plurality of sets of one or more cell characteristics, wherein each set of cell characteristics in the plurality of sets of cell characteristics corresponds to a different cell in a plurality of cells, and
determine a first set of one or more traffic characteristics corresponding to a first traffic stream at least in part by determining one or more desired quality of service metrics corresponding to the first traffic stream; and
a cell assignment module configured to:
select a first cell from the plurality of cells based on (i) the plurality of sets of cell characteristics and (ii) the first set of traffic characteristics, and
assign the first traffic stream to the first cell for an entire duration of the first traffic stream.

16. An apparatus according to claim 15, wherein the characteristic determination module is configured to determine the plurality of sets of cell characteristics at least in part by determining one or more of (i) a bandwidth of each cell in the plurality of cells, (ii) a coverage metric of each cell in the plurality of cells, (iii) a frequency of each cell in the plurality of cells, (iv) an interference metric of each cell in the plurality of cells, (v) a signal propagation metric of each cell in the plurality of cells, (vi) a cell usage metric of each cell in the plurality of cells, and (vii) channel state information of each cell in the plurality of cells.

17. An apparatus, comprising:
one or more processors; and
a computer readable medium having stored thereon machine executable instructions that, when executed by the one or more processors, cause the one or more processors to:
determine a plurality of sets of one or more cell characteristics, wherein each set of cell characteristics in the plurality of sets of cell characteristics corresponds to a different cell in a plurality of cells;
determine a first set of one or more traffic characteristics corresponding to a first traffic stream;
select a first cell from the plurality of cells based on (i) the plurality of sets of cell characteristics and (ii) the first set of traffic characteristics at least in part by determining a threshold based on the plurality of sets of cell characteristics,
determining a score based on the first set of traffic characteristics, and
comparing the score to the threshold; and
assign the first traffic stream to the first cell for an entire duration of the first traffic stream.

18. An apparatus, comprising:
one or more processors; and
a computer readable medium having stored thereon machine executable instructions that, when executed by the one or more processors, cause the one or more processors to:
determine a plurality of sets of one or more cell characteristics, wherein each set of cell characteristics in the plurality of sets of cell characteristics corresponds to a different cell in a plurality of cells;
determine a first set of one or more traffic characteristics corresponding to a first traffic stream at least in part by
determining a plurality of cell ranks based on the plurality of sets of cell characteristics, wherein each cell rank in the plurality of cell ranks corresponds to a different cell in the plurality of cells,
determining a first traffic stream rank based on the first set of traffic characteristics, and
selecting the first cell from the plurality of cells based on (i) the plurality of cell ranks and (ii) the first traffic stream rank;
select a first cell from the plurality of cells based on (i) the plurality of sets of cell characteristics and (ii) the first set of traffic characteristics; and
assign the first traffic stream to the first cell for an entire duration of the first traffic stream.

19. An apparatus according to claim 18, wherein the machine executable instructions cause the one or more processors to select the first cell from the plurality of cells at least in part by selecting a cell having a cell rank equal to the first traffic stream rank.

20. An apparatus, comprising:
one or more processors; and
a computer readable medium having stored thereon machine executable instructions that, when executed by the one or more processors, cause the one or more processors to:
determine a plurality of sets of one or more cell characteristics, wherein each set of cell characteristics in the plurality of sets of cell characteristics corresponds to a different cell in a plurality of cells;
determine a first set of one or more traffic characteristics corresponding to a first traffic stream at least in part by determining one or more desired quality of service metrics corresponding to the first traffic stream;
select a first cell from the plurality of cells based on (i) the plurality of sets of cell characteristics and (ii) the first set of traffic characteristics; and
assign the first traffic stream to the first cell for an entire duration of the first traffic stream.

21. An apparatus according to claim 20, wherein the machine executable instructions cause the one or more processors to determine the plurality of sets of cell characteristics at least in part by determining one or more of (i) a bandwidth of each cell in the plurality of cells, (ii) a coverage metric of each cell in the plurality of cells, (iii) a frequency of each cell in the plurality of cells, (iv) an interference metric of each cell in the plurality of cells, (v) a signal propagation metric of each cell in the plurality of cells, (vi) a cell usage metric of each cell in the plurality of cells, and (vii) channel state information of each cell in the plurality of cells.

* * * * *